United States Patent Office 3,157,805
Patented Nov. 17, 1964

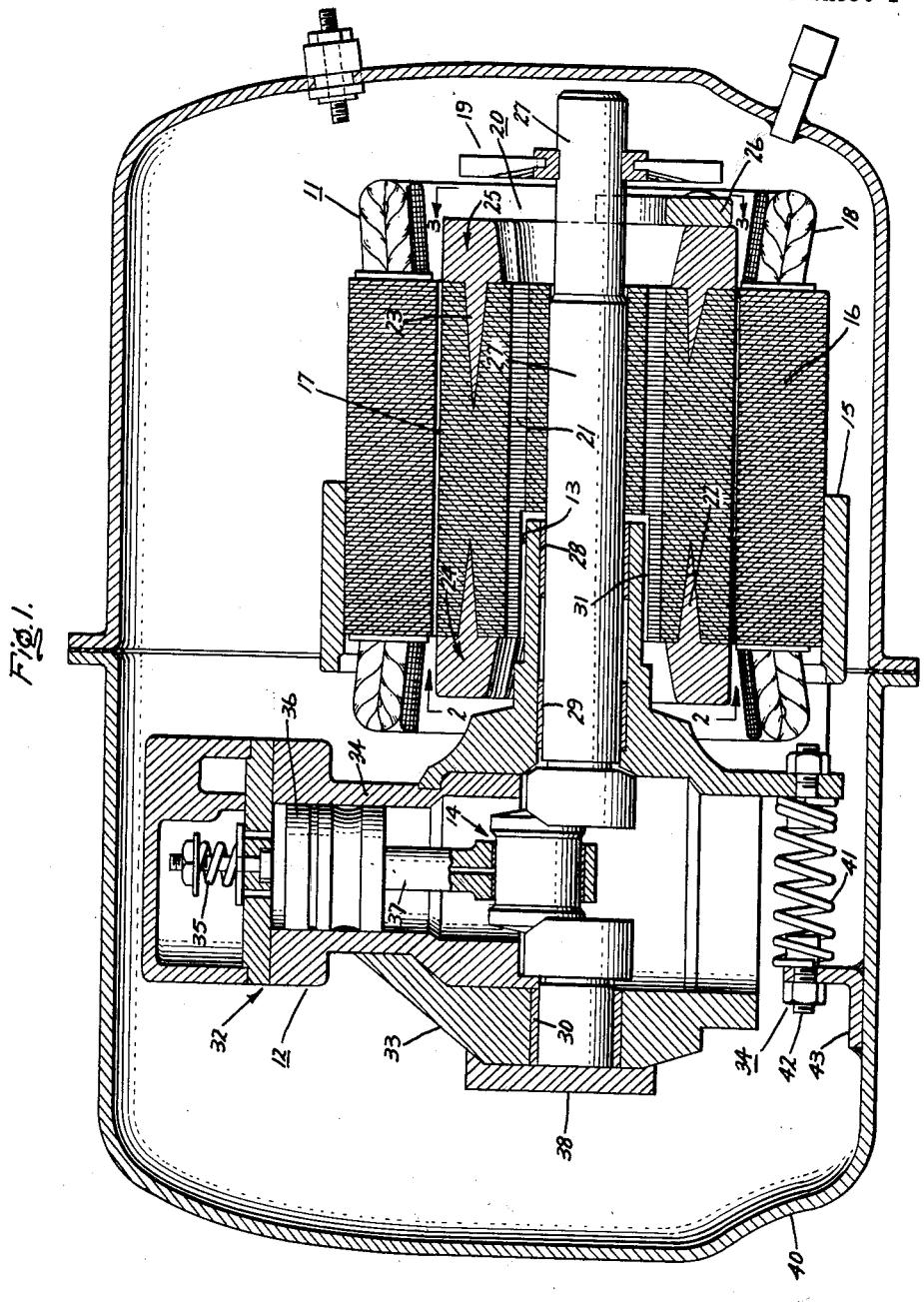

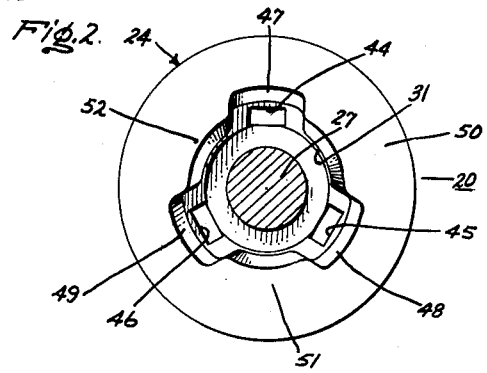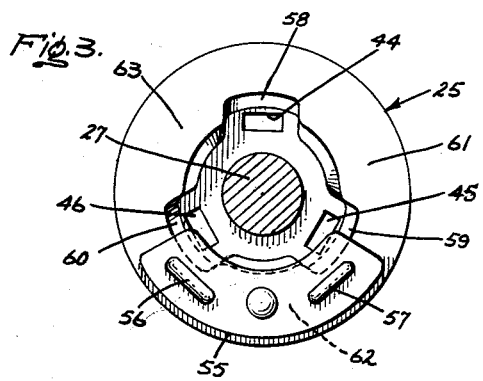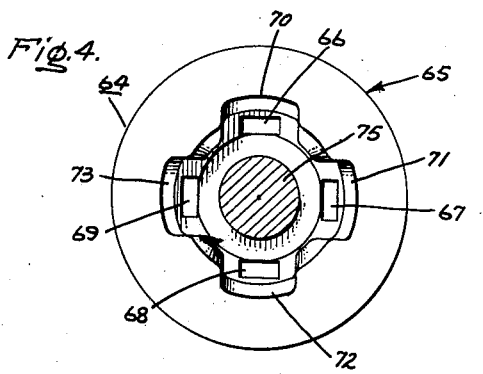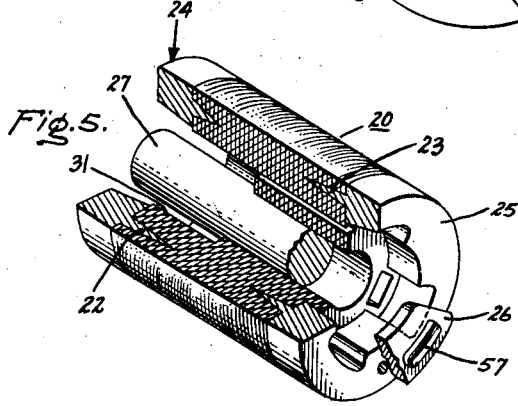

3,157,805
ROTOR END RING ARRANGEMENT FOR
DYNAMOELECTRIC MACHINES
William R. Hoffmeyer and John H. Johnson, both of Holland, Mich., assignors to General Electric Company, a corporation of New York
Filed May 8, 1961, Ser. No. 108,416
6 Claims. (Cl. 310—61)

This invention relates to dynamoelectric machines and more particularly to an improved rotor end ring arrangement for dynamoelectric machines such as electric motors.

In many applications of small dynamoelectric machines, it is desirable, if not essential, that the temperature rise in the rotor end rings be maintained within predetermined limits. In order to maintain the temperature rise within these limits, it is generally required that the heat generated in the rotor end rings be effectively dissipated. If the temperature rise exceeds the predetermined limits, the life of the compressor and motor may be adversely affected. This is particularly true where induction motors of the squirrel cage type are employed in applications which impose limitations on the dimensions of the end ring. For example, in a hermetically sealed motor and fluid compressor having a unitary bearing construction, the compressor housing projects inwardly into a counterbore in the rotor at the point where the motor shaft enters the housing. Thus, a limitation is imposed in such applications on the internal diameter of the rotor end rings and the radial position of the ventilating ducts in the motor rotor. Further, because of the counterbore in the rotor, the laminations forming a counterbore must be securely held in assembled relation since they are not secured to the shaft. Also, because of the proximity of the rotor to the compressor housing, the axial height of the end ring is limited. It is desirable therefore that a rotor end ring arrangement be provided that is suitable for such applications. In addition, it is, of course, desirable that the end rings be readily manufactured and assembled on the rotor.

Past constructions of rotor end rings have not proven to be satisfactory in such applications. Generally, the end rings of the prior art were designed with a substantially uniform cross sectional area in order to maintain the current density substantially constant throughout the end ring during operation so that predetermined temperature rise limits are not exceeded. Heretofore, the inside diameter of rotor end rings have been limited substantially to the diameter of a circle encompassing the ventilating ducts in the rotor. In order to control the temperature rise of the end ring, the current density in the end ring was kept below some preselected value. To lower the temperature rise in the end ring, the cross sectional area was usually increased by increasing the axial height of the end ring since it was generally assumed that restricted sections in the end rings would produce hot spots. Accordingly, there is a need in the industry for an improved end ring arrangement which will meet the requirements of applications that impose severe limitations on the dimensions of the end ring.

Therefore, it is a principal object of the present invention to provide a dynamoelectric machine with an improved rotor end ring arrangement wherein the temperature rise in the rotor end ring can be effectively maintained within predetermined limits.

It is another object of our invention to provide a new and improved end ring arrangement for use in dynamoelectric machines which may be readily produced and assembled in a small dynamoelectric machine at relatively low cost.

A further object of the invention is to provide an improved rotor end ring arrangement wherein said rotor end rings impart additional mechanical strength to said rotor and maintain the temperature rise in the end ring within predetermined limits.

In carrying out our invention in one form thereof, we provide a rotor end ring arrangement for an induction type electric motor having a stator, frame assembly and a rotor assembly. The rotor assembly is comprised of a plurality of laminations having a plurality of axially extending cooling ducts with apertures at the end faces thereof and a plurality of slots accommodating the rotor conductors. Rotor end rings are disposed at the end faces of the rotor and join the rotor conductors in short circuit relation. At least one of the rotor end rings is formed with at least a pair of scalloped portions dividing the rotor ring into segmental portions. Each scalloped portion is disposed in a partially circumscribing relation with an aperture of a cooling duct. The segmental portions extend inwardly and radially of the scalloped portions and provide a heat sink during operation whereby heat generated in the scalloped portion during operation due to the increased current density therein is absorbed by the heat sink and the temperature rise in the rotor end ring is maintained within prescribed limits.

In another aspect of the invention, we have provided balance weight lugs at locations adjacent to the scalloped portions of an end ring to cooperate with said segmental portions in absorbing heat from the scalloped portion during operation. Further, the draft angle of the outside diameter of a rotor end ring is formed with a substantially zero draft or, in other words, with a substantially cylindrical outer periphery.

In accordance with the invention, where the rotor is provided with a counterbore for accommodating a bearing assembly, the segmental portions of the rotor end rings extend radially and inwardly of the scalloped portions substantially to the outer diameter of the counterbore in the rotor. Thus, the rotor end rings aid in maintaining the laminations, which define the counterbore in the rotor, in assembled relation.

The subject matter which we regard as our invention is particularly pointed out and distinctly claimed in the concluding portion of the specification. Our invention, however, both as to organization and method of operation together with further objects and advantages thereof may be best understood by reference to the following description taken in connection with the accompanying drawings in which:

FIG. 1 is a sectional view of an electric motor and compressor assembly in which the invention is embodied;

FIG. 2 is a view of the rotor assembly taken on line 2—2 of FIG. 1 with the shaft and bearing assembly being broken away to show the relative location of the rotor end rings with respect to the cooling duct apertures and counterbored portion of the rotor;

FIG. 3 is a view of the rotor assembly taken on line 3—3 of FIG. 1;

FIG. 4 is a plan view of a rotor end ring arrangement wherein the rotor assembly is formed with four cooling ducts; and FIG. 5 is a perspective view of the rotor assembly broken away in part to illustrate the construction of the laminations defining the counterbore of the rotor and the arrangement of the rotor end rings with respect thereto.

Referring now to the drawings in more detail and specifically to FIG. 1, we have illustrated one form of the invention as it is applied to a squirrel cage induction type of motor 11. In this exemplification of the invention the motor 11 is utilized to drive a single piston compressor 12.

As will hereinafter be more fully explained, the unit bearing assembly 13 which rotatably supports the motor 11 and the crankshaft and piston assembly 14 imposes certain limitations on the design of the motor 11.

The motor 11 is supported by an outer cylindrical shell member or frame assembly 15 within which is mounted a stator core member 16 formed of a plurality of laminations of magnetic material. The shell member 15 is rigidly associated with unit bearing assembly 13. The stator core 16 includes a rotor receiving bore 17 and energizing windings or coils 18 mounted in stator slots (not shown) provided in the stator core 16. Rotatably mounted within the bore 17 provided by the stator core 16 and excited magnetically therefrom is a rotor assembly 20. The rotor assembly 20 includes a rotor core 21, a plurality of rotor conductors 22, 23 (only two of which are shown in FIG. 1), a pair of rotor end rings 24, 25, a balance weight 26, and a shaft 27. The rotor core 21 is formed of a stack of magnetic laminations which are held in juxta-positioned relationship by rotor end rings 24 and 25 which join the rotor conductors 22, 23 in short circuit relation. The rotor core 21 is nonrotatably mounted on the shaft 27. A ventilating fan 19 is also nonrotatably attached to shaft 27.

In the illustrative embodiment of the invention shown in FIG. 1, the crankshaft of the compressor 12 is an integral part of the shaft 27. Shaft 27 is carried by bearings 28, 29 of the unit bearing assembly 13 and bearing 30 of the compressor 12. It will be seen that the unit bearing assembly 13 extends inwardly into counterbore 31 formed in the rotor core 21. In applications utilizing such a unit bearing construction, it is important that the end of the motor 11 adjacent to the unit bearing assembly 13 be disposed as close as practicable to the compressor 12. Because of this requirement a restriction is imposed on the axial height of the rotor end ring 24. Further, due to the fact that the unit bearing assembly 13 projects into the counterbore 31 provided in the rotor core 21, the counterbore limits the inner diameter of the end ring 24 and imposes a further dimensional restriction on the end ring design. The manner in which the end ring arrangement of the present invention overcomes these restrictions will readily become apparent as this description proceeds.

The single piston compressor 12 illustrated in FIG. 1 is shown for the purpose of disclosing a useful application of an induction motor 11 incorporating an end ring arrangement in accordance with the invention. The compressor 12 includes a cylinder head assembly 32, a compressor body 33, a cylinder 34, intake and exhaust valves 35 (only one of which is shown), a piston 36, a piston rod 37 journaled on the crankshaft portion of shaft 27, an end cap 38 and a support assembly 39 attached to a hermetically sealed casing 40. It will be seen that the support assembly is comprised of a spring 41, a tie bolt 42 and a bracket 43, which provide a resilient mounting for the compressor 12 and motor 11.

Referring now to the view of the rotor end ring 24 and rotor 20 shown in FIG. 2, it will be noted that the rotor 20 is formed with a plurality of axially extending cooling ducts 44, 45, 46 which provide a passageway for fluid flow through the rotor 20. Although only three cooling ducts 44, 45, 46 are shown in the embodiment of the invention illustrated in FIG. 3, it will be appreciated that as may be required in a particular design two or more ducts may be formed in the rotor laminations to provide the necessary cooling. A plurality of scalloped portions 47, 48, 49 are provided in a partially circumscribing relation to the apertures of the cooling ducts 44, 45, 46, respectively. The scalloped portions 47, 48, 49 divide the end ring 24 into three segmental portions 50, 51, 52. It will be seen that the inner edges of the segmental portions 50, 51, 52 extend substantially to the counterbore 31 of the rotor 20 and project inwardly and radially of the scalloped portions 47, 48, 49. Further, as is best shown in the cross sectional view of the rotor end rings 24, 25 illustrated in FIG. 1, the rotor end rings are formed with an outer periphery which is substantially cylindrical in shape. In other words, it is formed with a zero draft angle instead of the 6 to 8 degrees conventionally employed in prior art rotor end ring designs. The inner periphery of the rotor end ring was formed with a draft angle of approximately 4 to 6 degrees.

From the foregoing description, it will be apparent that the rotor end ring arrangement during operation of the motor 11 provides a plurality of segmental portions 50, 51, 52 forming heat sinks interposed between the restricted sections or scalloped portions 47, 48, 49 of the rotor end ring. Although during operation the current density in the scalloped portions 47, 48, 49 is greater than the current density in the segmental portions 50, 51, 52, because of the greater mass of the segmental portions 50, 51, 52, heat generated in the scalloped portions 47, 48, 49 is absorbed by the segmental portions 50, 51, 52 which are at a lower temperature. Thus, the temperature rise of the rotor end rings 24, 25 can thereby be maintained within predetermined limits. Further, because of the disposition of the scalloped portions 47, 48, 49 in partially circumscribing relation with the cooling ducts 44, 45, 46, cooling of the scalloped portions 47, 48, 49 is also aided by the passage of the cooling fluid.

An additional desirable feature inherent in a rotor end ring formed with scalloped portions is that the segmental portions formed thereby impart additional mechanical strength to the rotor 20. This is particularly important in application where a counterbore is formed in the rotor as in the case illustrative embodiment of the invention shown in FIG. 1. It will be noted that the only support for the laminations which define the counterbore 31 of the rotor 20 is provided by the rotor conductors which extend through these laminations and are joined at the end by the rotor end ring 24. Unless the laminations defining the counterbored section of the rotor 20 are adequately supported and firmly held in juxtapositioned relation, they may work loose and rub the stator 16.

In FIG. 3, we have illustrated a view of the rotor end ring 25 to which a balance weight 55 is attached. The balance weight 55, is attached to the rotor end ring 25 by means of a pair of lugs 56, 57 which are peened at the ends to rivet the balance weight 55 to the rotor end ring 25. The balance weight 55 extends over an angle of approximately 120 degrees in order to counterbalance the weight of the crankshaft of the compressor 12. It will be seen except for the lugs 56, 57, the rotor end ring 25 is substantially similar to the rotor end ring 24. Rotor end ring 25 is disposed at the end face of rotor assembly 64 and is formed with scalloped portions 58, 59, 60 and three segmental portions 61, 62, 63 adjacent to the apertures of the cooling ducts 44, 45, 46. It was found that by locating the lugs 56, 57 adjacent to the scalloped portions 59, 60 of the rotor end ring 25 resulted during operation in additional heat absorption from the scalloped portions 59, 60. Thus, the lugs 56, 57 cooperate with segmental portion 62 to provide an adequate heat sink to insure that the temperature rise of the rotor end 25 is maintained within predetermined limits.

In FIG. 4 we have illustrated another embodiment of the invention wherein a scalloped rotor end ring 65 in accordance with the invention is utilized in connection with a rotor formed with four cooling ducts 66, 67, 68, 69. The rotor 64 is secured to a centrally disposed shaft 75. Four scalloped portions are disposed in a partially circumscribing relation with the cooling ducts 66, 67, 68, 69. It will be noted that cooling ducts 66 and 68 are not formed in the counterbored section of the rotor 64. However, if a pair of the cooling ducts are formed in the counterbored section, it is possible to eliminate a pair of the cooling ducts. In such an arrangement the segmental portions would extend substantially to the edge of the counterbore.

As is best illustrated in FIG. 5, the rotor construction is of the squirrel cage type. The rotor conductors 22, 23 and the other rotor conductors, which are disposed in slots near the outer periphery of the rotor assembly 20, are die cast integrally with the rotor end rings 24, 25. The rotor 20 is nonrotatably secured to shaft 27 by any suitable means, such as an interference fit or by keying the rotor 20 to shaft 27. As shown in FIG. 5, only a portion of the laminations of the rotor 20 are attached to the shaft 27. The rotor laminations which provide the counterbored section 31 are held in assembled relation with the rotor 20 by the rotor end rings 24, 25 and the plurality of conductor bars 22, 23 disposed in slots within the rotor 20.

From the foregoing description it will be seen that improved rotor end ring arrangement is provided for an induction motor in which the temperature rise of a rotor end can be effectively maintained within predetermined limits by the use of scalloped portions formed in the rotor end ring adjacent to the apertures of the cooling ducts in a partially circumscribing relation thereto. This arrangement makes it possible to avoid an excessive temperature rise in the rotor end ring without increasing the axial height of the end ring thereby permitting the motor to be mounted in close proximity to the driven unit. A further advantage in the scalloped end ring arrangement is that the ratio of the rotor end ring height to volume can be reduced as compared with conventional end ring designs. A reduced height-to-volume ratio results in a more efficient casting arrangement because of the shorter material flow path and the overall decrease in the surface area of the rotor end ring which insures against premature cooling of the conducting material near the surface.

By way of a more specific exemplification of the invention and the advantages thereof, a 4 horsepower, 40 frame, two pole induction motor for a compressor was modified to incorporate the improved rotor end ring arrangement of the invention. When the motor had been previously tested under locked rotor condition utilizing conventional rotor end rings having a height of approximately .735 of an inch and a cross sectional area of .400 square inch, the end ring heated to a temperature of 400 degrees Fahrenheit in a minimum time of 16 seconds. The conventional end ring had an inner diameter substantially equal to the diameter of a circle encompassing the ventilation ducts. By employing the scalloped arrangement shown in FIG. 2 in the motor, the axial height of the rotor end rings was reduced to .690 of an inch. If the height of a conventional rotor end ring were reduced to .690 of an inch, the end ring would heat up to a temperature of 400 degrees Fahrenheit in an interval of approximately 14 seconds under locked rotor condition. However, by employing the scalloped end ring arrangement shown in FIG. 2, we found that the segmental portions 50, 51, 52 of the end ring 24 did not reach 400 degrees Fahrenheit until after 18 seconds while the scalloped portions 47, 48, 49 did not reach 400 degrees Fahrenheit until 15.8 seconds. Thus, in accordance with the invention it is possible to effectively reduce the axial height of an end ring and still maintain the temperature rise of the end ring below predetermined limits.

It will be obvious to those skilled in the art that the improved end ring arrangement as described above, provides many advantages, particularly for motors employing a unit bearing construction, by permitting the axial height of end rings to be reduced without affecting the performance characteristics of the rotor. It is possible to reduce the overall axial length of the motor and driven unit. While the present invention has been described with reference to preferred embodiments of our invention, it will be understood that numerous modifications may be made by one skilled in the art which are within the scope of this invention, and we therefore intend in the following claims to cover all such equivalent variations that fall within the invention.

What we claim as new and desire to secure by Letters Patent of the United States:

1. In an electric motor having a stator and a frame assembly, a shaft, a rotor mounted on said shaft and comprised of a plurality of laminations, said rotor being formed with a plurality of cooling ducts extending axially through said rotor and having apertures at the ends thereof, said rotor including a plurality of slots for accommodating rotor conductors, a plurality of conductors positioned in said slots, means for rotatably supporting said shaft, and a pair of end rings disposed at the respective ends of said rotor and joining said conductors, at least one of said end rings having a plurality of scalloped portions disposed in a partially circumscribing relationship with the apertures of said cooling ducts, said scalloped portions dividing said end ring into segmental portions projecting inwardly of said scalloped portions, said segmental portions providing a heat sink for absorbing heat from said scalloped portions during operation of the motor.

2. A rotor assembly for use in an electric motor, said rotor assembly comprising a rotatable shaft, a plurality of conductors, a rotor mounted on said shaft and comprising a stack of laminations having a plurality of axially extending cooling ducts with apertures at the end faces of said rotor and a plurality of slots for accommodating said conductors and extending through said rotor near its outer periphery, a pair of end rings disposed at the end faces of said rotor and short circuiting said conductors at the ends thereof, at least one of said end rings being formed with at least a pair of scalloped portions symmetrically disposed on said end rings and in a partially circumscribing relationship with at least a pair of the apertures of the ventilating ducts, said scalloped portions dividing said end ring into segmental portions, the inner edge of the segmental portions extending radially and inwardly of said scalloped portions and providing a heat sink to absorb the heat generated in the scalloped portions of the end ring thereby maintaining the temperature rise of said end ring during operation below predetermined limits.

3. A rotor assembly for use in electric motors, said rotor assembly comprising a rotatable shaft, a rotor mounted on said shaft and comprising a stack of laminations having a plurality of slots extending the length of said rotor near the outer periphery of said rotor and a plurality of cooling ducts formed in said rotor and axially extending therethrough, a plurality of conductors disposed in said slots, a pair of end rings disposed at the end faces of said rotor and joined to said conductors to short circuit the ends thereof, the inner diameter of at least one of said end rings being formed with a plurality of scalloped portions, each of said scalloped portions being disposed in a partially circumscribing relationship with respect to the opening of one of said plurality of cooling ducts, said scalloped portions dividing said end rings into segmental portions, said segmental portions extending radially and inwardly of said scalloped portions and providing a heat sink during operation for heat generated in the scalloped portions of said end ring so that the temperature rise of said rotor end ring can be maintained within predetermined limits.

4. A rotor assembly for use in an electric motor, said rotor assembly comprising a rotatable shaft, a rotor mounted on said shaft and comprising a stack of laminations having a plurality of slots for accommodating rotor conductors, a plurality of rotor conductors disposed in said slots, said rotor having formed therein a plurality of cooling ducts extending axially therethrough to provide a passageway for cooling fluid and having apertures at the ends thereof, a substantially annular-shaped rotor end ring disposed at each end of said rotor and joining said conductor bars, at least one of said end rings having scalloped portions and segmental portions, said scalloped portions being disposed in a partially circumscribing relation to at least a pair of the apertures of said segmental portions extending inwardly and radially of said, at least a pair of balance weight lugs integrally formed on one of said end rings and extending axially thereof for attaching balance weights thereon, said lugs being located adjacent to said scalloped portions and cooperating with said segmental portions to form a heat sink to absorb the heat generated in said scalloped portions during operation in order to maintain the temperature rise in said rotor ring within predetermined limits.

5. A rotor assembly for use in an electric motor, said rotor assembly comprising a rotatable shaft, a rotor mounted on said shaft, said rotor having a plurality of cooling ducts formed therein with apertures at ends of said rotor, and having a plurality of slots extending through said rotor near the outer periphery thereof for accommodating rotor conductors, a plurality of conductors disposed in said slots, a pair of substantially annular end rings disposed at each end of said rotor, said end rings joining said conductors in closed electrical circuit and being formed with a plurality of scalloped portions and segmental portions, each of said scalloped portions being disposed in a partially circumscribing relation with respect to one of the apertures of the cooling ducts, said segmental portions extending inwardly and radially of said scalloped portion and providing a heat sink whereby heat generated in the scalloped portion due to the increased current density therein during operation is absorbed therefrom so that the temperature rise in said rotor end rings is effectively maintained within predetermined limits, and said end rings having a substantially cylindrical outer periphery.

6. A rotor assembly for use in an electric motor, said rotor assembly comprising a rotatable shaft, a rotor mounted on said shaft and comprising a stack of laminations having a plurality of slots formed therein and extending therethrough for accommodating rotor conductors and having a plurality of cooling ducts extending axially therethrough and having apertures at the ends of said rotor, a plurality of rotor conductors disposed in said slots, said rotor having a counterbore for accommodating a bearing assembly extending therein, a rotor end ring disposed at each end of said rotor and joining said conductors in short circuit relationship, at least one of said rotor end rings being formed with a plurality of scalloped portions and segmental portions, said scalloped portions being disposed in partially circumscribing relation with respect to at least a pair of said cooling ducts, said segmental portions of one of said rotor end rings extending radially and inwardly substantially to the outer diameter of said counterbore and said end rings maintaining the laminations defining said counterbore in assembled relation and said segmental portions of said rotor end rings providing a heat sink whereby heat generated in the said scalloped portion during operation is absorbed by said segmental portions in order to maintain the temperature rise in said end ring within predetermined limits.

References Cited by the Examiner
UNITED STATES PATENTS

| | | |
|---|---|---|
| 886,035 | 4/08 | Behrend. |
| 2,520,020 | 8/50 | Sollosy. |
| 2,610,922 | 9/52 | Johns. |

MILTON O. HIRSHFIELD, *Primary Examiner.*

DAVID X. SLINEY, *Examiner.*